US008126630B2

(12) United States Patent
Merrion et al.

(10) Patent No.: US 8,126,630 B2
(45) Date of Patent: Feb. 28, 2012

(54) SYSTEM FOR CONTROLLING TORQUE CONVERTER TEMPERATURE DURING TORQUE CONVERTER STALL CONDITIONS

(75) Inventors: Robert Merrion, Pittsboro, IN (US); Brett Caldwell, New Palestine, IN (US); John Kresse, Martinsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 244 days.

(21) Appl. No.: 12/612,610

(22) Filed: Nov. 4, 2009

(65) Prior Publication Data
US 2011/0054749 A1    Mar. 3, 2011

Related U.S. Application Data

(60) Provisional application No. 61/111,061, filed on Nov. 4, 2008.

(51) Int. Cl.
*G06F 19/00* (2011.01)

(52) U.S. Cl. .......................... 701/100; 701/99

(58) Field of Classification Search ............. 701/99–100
See application file for complete search history.

(56) References Cited

U.S. PATENT DOCUMENTS

| 2008/0227597 A1* | 9/2008 | Povirk et al. ............... 477/62 |
| 2009/0131222 A1* | 5/2009 | Barney et al. .............. 477/174 |
| 2010/0056330 A1* | 3/2010 | Schuh ....................... 477/52 |

* cited by examiner

*Primary Examiner* — Hussein Elchanti
(74) *Attorney, Agent, or Firm* — Barnes & Thornburg LLP (57) ABSTRACT

A method and system are provided for controlling the operating temperature of a torque converter during torque converter stall conditions. The torque converter has a pump rotatably driven by an internal combustion engine and a rotatable turbine fluidly coupled to the pump. The system first determines whether the torque converter is currently in a torque converter stall condition, and, if so, determines a slip speed as a difference in rotational speeds between the pump and the turbine, determines an engine output torque limit as a function of the slip speed and a desired slip speed, and controls the operating temperature of the torque converter by limiting output torque produced by the engine based on the engine output torque limit.

21 Claims, 6 Drawing Sheets

SYSTEM FOR CONTROLLING TORQUE CONVERTER TEMPERATURE DURING TORQUE CONVERTER STALL CONDITIONS

CROSS-REFERENCE TO RELATED U.S. APPLICATION

This patent application claims the benefit of, and priority to, provisional patent application Ser. No. 61/111,061, filed Nov. 4, 2008, the disclosure of which is incorporated herein by reference.

FIELD OF THE INVENTION

The present invention relates generally to fluid couplings between an upstream internal combustion engine and one or more downstream drivetrain components, and more specifically to systems for controlling the operating temperature of torque converters coupled between an upstream internal combustion engine and a downstream transmission.

BACKGROUND

Conventional torque converters are typically positioned between an upstream prime mover, such as an internal combustion engine, and a downstream transmission, and include a pump that is driven by the prime mover and fluidly coupled to a turbine that is connected to the transmission. It is desirable to control the operating temperature fluidly coupled components generally, and of a torque converter specifically, particularly during torque converter stall conditions in which the rotational speed of the turbine is at or near zero and the rotational speed of the pump is above a threshold pump speed.

SUMMARY

The present invention may comprise one or more of the features recited in the attached claims, and/or one or more of the following features and combinations thereof. A method is provided for controlling the operating temperature of a torque converter during torque converter stall conditions. The torque converter has a pump rotatably driven by an internal combustion engine and a rotatable turbine fluidly coupled to the pump. The method may comprise determining whether the torque converter is currently in a torque converter stall condition and, if the torque converter is currently in the stall condition, determining a slip speed as a difference in rotational speeds between the pump and the turbine, determining an engine output torque limit as a function of the slip speed and a desired slip speed, and controlling the operating temperature of the torque converter by limiting output torque produced by the engine based on the engine output torque limit.

The method may further comprise determining the desired slip speed based on the operating temperature of the torque converter.

Determining whether the torque converter is currently in a torque converter stall condition may comprise monitoring rotational speed of the turbine, monitoring rotational speed of the pump, and determining that the torque converter is currently in the stall condition if the rotational speed of the turbine is less than a turbine speed threshold and the rotational speed of the pump is greater than a pump speed threshold.

Determining an engine output torque limit may comprise determining a first engine output torque limit as a function of the slip speed if the torque converter has been in the stall condition for at least a first predefined time period and the slip speed is greater than a first desired slip speed. Controlling the operating temperature of the torque converter may then comprise limiting the output torque produced by the engine based on the first engine output torque limit. The method may further comprise determining the first desired slip speed based on the operating temperature of the torque converter.

Determining an engine output torque limit may further comprise determining a second engine output torque limit as a function of the slip speed if the torque converter has been in the stall condition for at least a second predefined time period after limiting the output torque produced by the engine based on the first engine output torque limit and the slip speed is greater than a second desired slip speed that is less than the first desired slip speed. Controlling the operating temperature of the torque converter may further comprise limiting the output torque produced by the engine based on the second engine output torque limit such that the output torque produced by the engine is limited to an engine output torque that is less than when the output torque produced by the engine is limited based on the first engine output torque limit. The method may further comprise determining the second desired slip speed based on the operating temperature of the torque converter.

The method may further comprise monitoring whether the torque converter continues to be in the stall condition when the output torque of the engine is being limited based on the engine output torque limit, and removing the engine output torque limit if the torque converter is no longer in the stall condition when the output torque of the engine is being limited based on the engine output torque limit. In one embodiment, monitoring whether the torque converter continues to be in the stall condition when the output torque of the engine is being limited based on the engine output torque limit may comprise monitoring rotational speed of the turbine, monitoring rotational speed of the pump, and determining that the torque converter is currently in the stall condition if the rotational speed of the turbine is less than a turbine speed threshold and the rotational speed of the pump is greater than a pump speed threshold. Monitoring whether the torque converter continues to be in the stall condition when the output torque of the engine is being limited based on the engine output torque limit may alternatively or additionally comprise monitoring a service brake of a vehicle carrying the torque converter, and determining that the torque converter is in the stall condition as long as the service brake is engaged and the rotational speed of the pump is greater than a pump speed threshold.

Determining an engine output torque limit may comprise determining an engine torque limit offset as a function of the slip speed and the desired slip speed. Limiting output torque produced by the engine based on the engine output torque limit may then comprise limiting an engine torque command used to command output torque produced by the engine as a function of the engine torque limit offset. Alternatively or additionally, determining an engine output torque limit may comprise determining a fractional multiplier as a function of the slip speed and the desired slip speed, and limiting output torque produced by the engine based on the engine output torque limit may comprise limiting an engine torque command used to command output torque produced by the engine as a function of the fractional multiplier. Alternatively or additionally still, determining an engine output torque limit may comprise determining a maximum engine torque limit as a function of the slip speed and the desired slip speed, and limiting output torque produced by the engine based on the engine output torque limit may comprise limiting an engine torque command used to command output torque produced by the engine to a maximum value of the maximum engine torque limit.

A system for controlling the operating temperature of a torque converter during torque converter stall conditions may comprise a torque converter pump configured to be rotatably driven by an internal combustion engine, a torque converter turbine fluidly coupled to the pump and configured to be rotatably driven by the pump through the fluid coupling between the pump and turbine, a pump speed sensor configured to produce a pump speed signal corresponding to rotational speed of the pump, a turbine speed sensor configured to produce a turbine speed signal corresponding to rotational speed of the turbine, and a first control circuit. The first control circuit may include a memory having instructions stored therein that are executable by the first control circuit to process the pump and turbine speed signals to determine whether the torque converter is currently in a torque converter stall condition, and if the torque converter is currently in the stall condition to determine a slip speed as a difference in rotational speeds between the pump and the turbine, to determine an engine output torque limit as a function of the slip speed and a desired slip speed, and to control the operating temperature of the torque converter by limiting output torque produced by the engine based on the engine output torque limit.

The system may further comprise means for determining the operating temperature of the torque converter. The instructions stored in the memory of the first control circuit may further include instructions that are executable by the first control circuit to determine the desired slip speed based on the operating temperature of the torque converter.

The system may further comprise a second control circuit including a memory having instructions stored therein that are executable by the second control circuit to control output torque produced by the engine, and a communication link established between the first and second control circuits. The instructions stored in the memory of the first control circuit may include instructions that are executable by the first control circuit to limit output torque produced by the engine based on the engine output torque limit by sending the engine output torque limit to the second control circuit via the communication link. The instructions stored in the memory of the second control circuit may include instructions that are executable by the second control circuit to control limit the output torque produced by the engine based on the engine output torque limit. The instructions stored in the memory of the first control circuit may include instructions that are executable by the first control circuit to determine the engine output torque limit in the form of at least one of a torque offset, a fractional torque multiplier and a maximum torque limit.

The instructions stored in the memory of the first control circuit may include instructions that are executable by the first control circuit to determine an engine output torque limit as a function of the slip speed and a desired slip speed by determining a first engine output torque limit as a function of the slip speed if the torque converter has been in the stall condition for at least a first predefined time period and the slip speed is greater than a first desired slip speed, and to limit output torque produced by the engine based on the engine output torque limit by limiting the output torque produced by the engine based on the first engine output torque limit. The instructions stored in the memory of the first control circuit may further include instructions that are executable by the first control circuit to determine an engine output torque limit as a function of the slip speed and a desired slip speed by determining a second engine output torque limit as a function of the slip speed if the torque converter has been in the stall condition for at least a second predefined time period after limiting the output torque produced by the engine based on the first engine output torque limit and the slip speed is greater than a second desired slip speed that is less than the first desired slip speed, and to limit output torque produced by the engine based on the engine output torque limit by limiting the output torque produced by the engine based on the second engine output torque limit such that the output torque produced by the engine is limited to an engine output torque that is less than when the output torque produced by the engine is limited based on the first engine output torque limit. The system may further comprise means for determining the operating temperature of the torque converter, and the instructions stored in the memory of the first control circuit may further include instructions that are executable by the first control circuit to determine the first and second desired slip speeds based on the operating temperature of the torque converter.

The instructions stored in the memory of the first control circuit may include instructions that are executable by the first control circuit to monitor whether the torque converter continues to be in the stall condition when the output torque of the engine is being limited based on the engine output torque limit, and to remove the engine output torque limit if the torque converter is no longer in the stall condition when the output torque of the engine is being limited based on the engine output torque limit.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
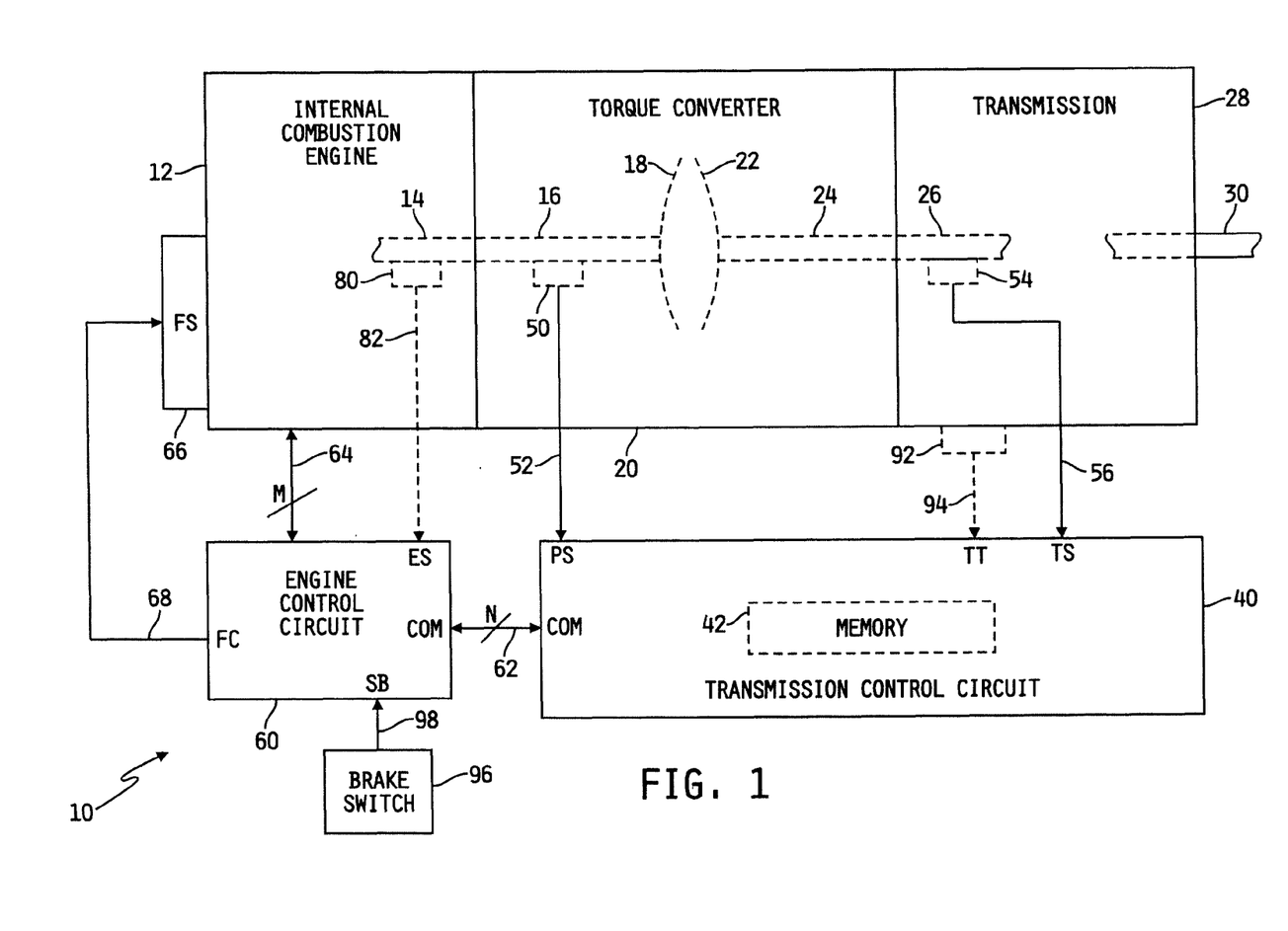
FIG. 1 is a diagram of one illustrative embodiment of a system for controlling the operating temperature of a torque converter during torque converter stall conditions.

Referring now to FIG. 1, a block diagram and schematic view is shown of one illustrative embodiment of a system 10 for controlling the operating temperature of a torque converter during torque converter stall conditions. In the illustrated embodiment, the system 10 includes an internal combustion engine 12 that is configured to rotatably drive an output shaft 14 that is coupled to an input or pump shaft 16 of a conventional torque converter 20. The input or pump shaft 16 is attached to an impeller or pump 18 that is rotatably driven by the output shaft 14 of the engine 12. The torque converter 20 further includes a turbine 22 that is attached to a turbine shaft 24, and the turbine shaft 24 is coupled to, or integral with, a rotatable input shaft 26 of a transmission 28. The transmission 28 is conventional and includes a number of automatically selected gear ratios. An output shaft 30 of the transmission is coupled to, e.g., via a conventional differential assembly (not shown), and rotatably drives, a drive axle (not shown) that, in turn, drives a number of wheels (not shown) of a vehicle carrying the engine 12, torque converter 20 and transmission 28. A conventional lockup clutch (not shown) may or may not be connected between the pump 18 and the turbine 22. The operation of the torque converter 20 is conventional in that the torque converter 20 is operable in a so-called "torque converter" mode during certain operating conditions such as vehicle launch, low speed and certain gear shifting conditions. In the torque converter mode, the lockup clutch, if included, is disengaged and the pump 18 rotates at the rotational speed of the engine output shaft 14 while the turbine 22 is rotatably actuated by the pump 18 through a fluid (not shown) interposed between the pump 18 and the turbine 22. In this operational mode, torque multiplication occurs through the fluid coupling such that the turbine shaft 24 is exposed to more drive torque than is being supplied by the engine 12, as is known in the art. In embodiments of the torque converter 20 that include a lockup clutch, the torque converter 20 is operable in a so-called "lockup" mode during other operating conditions, such as when certain gear ratios of the transmission 28 are engaged. In the lockup mode, the lockup clutch is engaged and the pump 18 is thereby secured to directly to the turbine 22 so that the engine output shaft 14 is directly coupled to the input shaft 26 of the transmission 28, as is also known in the art.

The system 10 further includes a transmission control circuit 40 that includes a conventional memory unit 42. The transmission control circuit 40 is illustratively microprocessor-based, and the memory unit 42 generally includes instructions stored therein that are executable by the transmission control circuit 40 to control operation of the transmission 28. In embodiments that include a lockup clutch the instructions may also include instructions that are executable by the transmission control circuit 40 to control operation of the lockup clutch. It will be understood, however, that this disclosure contemplates other embodiments in which the transmission control circuit 40 is not microprocessor-based, but is configured to control operation of the torque converter 20 and/or transmission 28 based on one or more sets of hardwired instructions and/or software instructions stored in the memory unit 42.

In the system 10 illustrated in FIG. 1, the torque converter 20 and the transmission 28 each include one or more sensors configured to produce sensor signals that are indicative of one or more operating states of the torque converter 20 and/or the transmission 28. For example, the torque converter 20 includes the conventional speed sensor 50 that is positioned and configured to produce a speed signal corresponding to the rotational speed of the torque converter pump shaft 16 (which is also the rotational speed of the output shaft 14 of the engine 12). The speed sensor 50 is electrically connected to a pump speed input, PS, of the transmission control circuit 40 via a signal path 52, and the transmission control circuit 40 is operable to process the speed signal produced by the speed sensor 50 in a conventional manner to determine the rotational speed of the pump shaft 16. The transmission 28 further includes a second speed sensor 54 that is positioned and configured to produce a speed signal corresponding to the rotational speed of the input shaft 26 of the transmission 28. The input shaft 26 of the transmission 28 is directly coupled to, or integral with, the turbine shaft 24, and the speed sensor 54 may alternatively be positioned and configured to produce a speed signal corresponding to the rotational speed of the turbine shaft 24. In any case, the speed sensor 54 may be conventional, and is electrically connected to a turbine speed input, TS, of the transmission control circuit 40 via a signal path 56. The transmission control circuit 40 is configured to process the speed signal produced by the speed signal 54 in a conventional manner to determine the rotational speed of the turbine shaft 24/input shaft 26 of the transmission 28.

In the illustrated embodiment, the memory unit 42 of the transmission control circuit 40 has one or more temperature models stored therein for estimating the operating temperature of the torque converter 20 as a function of one or more other operating parameters associated with the operation of the torque converter 20. In this embodiment, the transmission control circuit 40 is operable to execute instructions stored in the memory 42 to determine the operating temperature of the torque converter 20 based on the one or more models stored in the memory 42. Alternatively or additionally, the transmission 28 may further include a temperature sensor 92 that is positioned and configured to produce a temperature signal corresponding to an operating temperature of the transmission 28 and torque converter 20. An output of the temperature sensor 92 is electrically connected to a torque converter temperature input, TT, of the transmission control circuit 40 via a signal path 94. In one embodiment, for example, the torque converter 20 and the transmission 28 share operating fluids, e.g., transmission oil, and in this embodiment the temperature sensor 94 may be a conventional oil temperature sensor that produces a temperature signal corresponding to the operating temperature of the oil or other fluid shared by the torque converter 20 and the transmission 28, and thus the operating temperature of the torque converter 20 and transmission 28. It will be understood, however, that the system 10 may alternatively or additionally include one or more other or additional temperature sensors, real or virtual, operable to produce a signal that is indicative of the operating temperature of the torque converter 20.

In the illustrated embodiment, the system 10 further includes an engine control circuit 60 that is conventional, and is operable to control and manage the overall operation of the engine 12. An engine speed sensor 80 is configured and positioned to produce a speed signal that corresponds to the rotational speed of the engine 12, and that is provided to an engine speed input, ES, of the engine control circuit 60 via a signal path 82. The engine speed sensor 80 may be conventional, and the engine control circuit 60 is configured to process the speed signal produced by the engine speed sensor 80 and determine therefrom the rotational speed of the engine output shaft 14. A service brake switch (or sensor) 96 is electrically connected to a service brake input, SB, of the engine control circuit 60 via a signal path 98. The service brake switch (or sensor) 96 is configured to produce a signal that corresponds to the status of the service brake; e.g., depressed or not depressed, or to an amount of deflection of, or pressure applied to, the service brake, and the engine control circuit 60 is configured to process this signal to determine the status or state of the service brake.

A conventional fuel system 66 is coupled to the engine 12, and a fuel command output, FC, of the engine control circuit 60 is electrically connected to the fuel system 66 via one or more signal paths 68. The engine control circuit 60 is configured in a conventional manner to control engine fueling via control of fueling commands produced at the fuel command output, FC, and the fuel system 66 is responsive to the fueling commands produced by the engine control circuit 60 to supply fuel to the engine 12 in a conventional manner.

The engine control circuit 66 further includes a communication port, COM, that is electrically connected to a similar communication port, COM, of the transmission control circuit 40 via a number, N, of signal paths 62, wherein N may be any positive integer. The one or more signal paths 62 are typically referred to collectively as a data link. Generally, the engine control circuit 60 and the transmission control circuit 40 are operable to share information via the one or more signal paths 62 in a conventional manner. In one embodiment, for example, the engine control circuit 60 and transmission control circuit 40 are operable to share information via the one or more signal paths 62 in the form of one or more messages accordance with a society of automotive engineers (SAE) J-1939 communications protocol, although this disclosure contemplates other embodiments in which the engine control circuit 60 and the transmission control circuit 40 are operable to share information via the one or more signal paths 62 in accordance with one or more other conventional communication protocols.

Figure 2A:
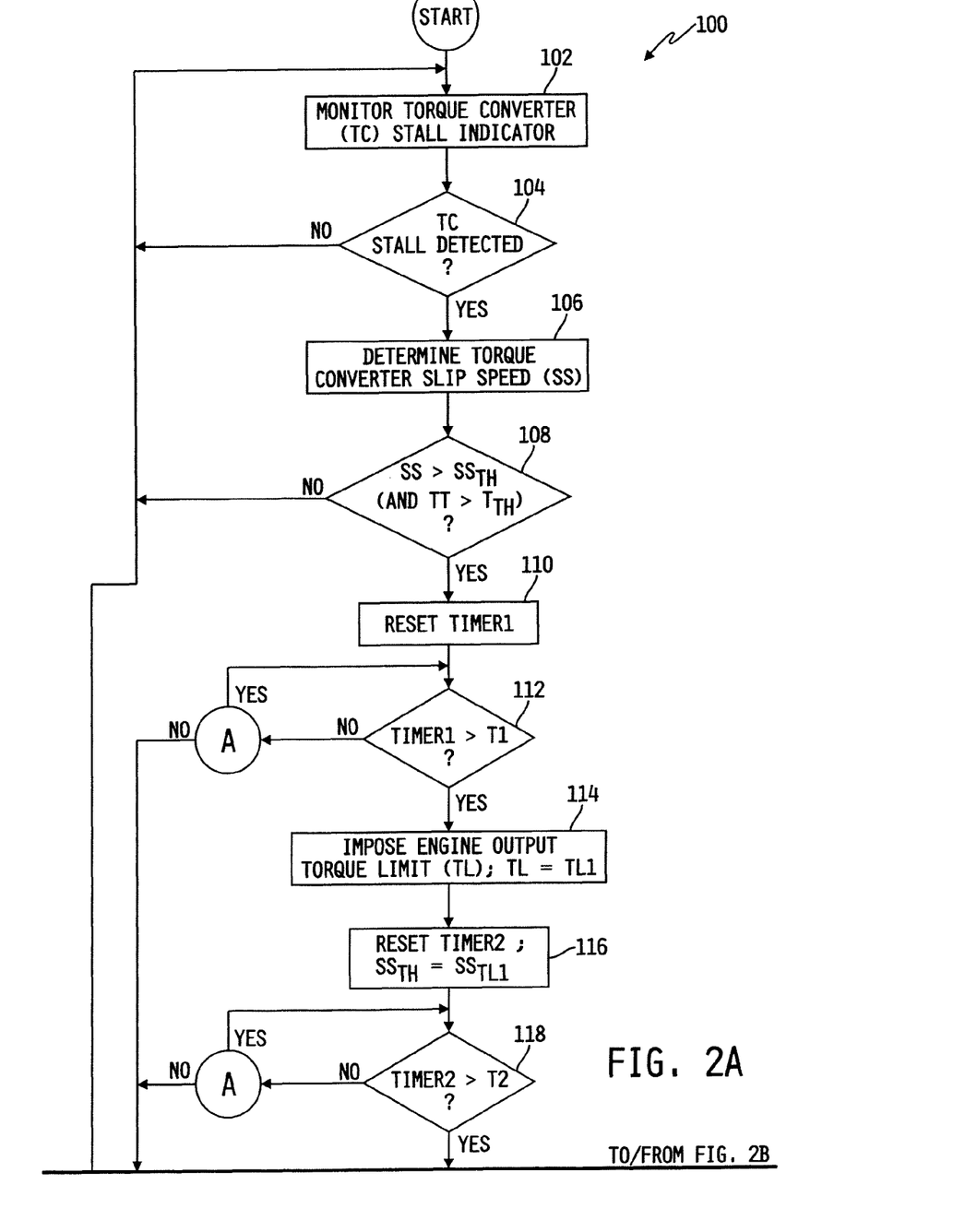
FIGS. 2A and 2B depict a flowchart of one illustrative embodiment of a process, executable by the control circuit of FIG. 1, for controlling the operating temperature of the torque converter.
Figure 2B:
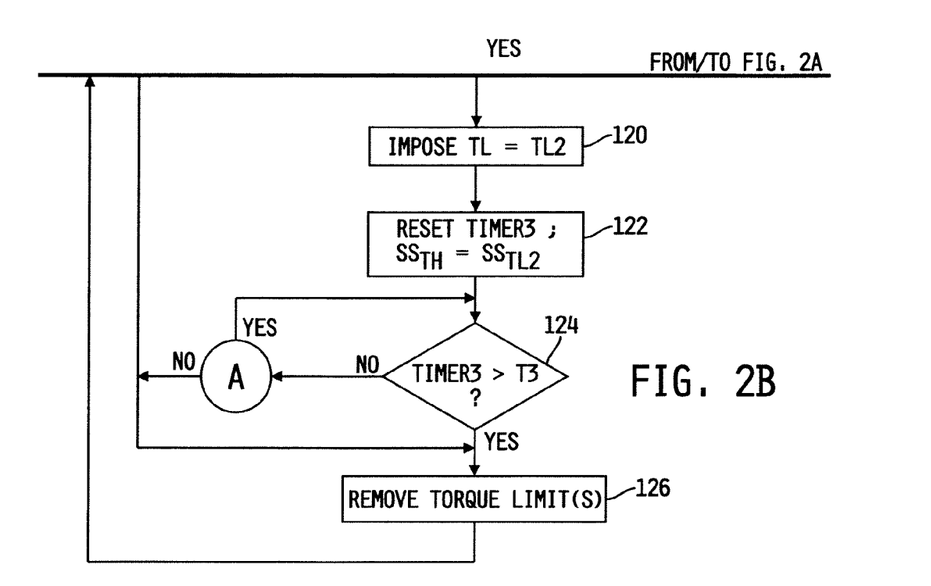

Referring now to FIGS. 2A and 2B, a flowchart is shown of one illustrative embodiment of a process 100 for controlling the operating temperature of the torque converter 20 under torque converter stall conditions. Illustratively, the process 100 is stored in the memory 42 of the transmission control circuit 40 in the form of instructions that are executable by the transmission control circuit 40 to control the operating temperature of the torque converter 20 under the torque converter stall conditions. The process 100 begins at step 102 where the transmission control circuit 40 is operable to monitor at least one torque converter stall indicator and thereafter at step 104 the transmission control circuit 40 is operable to determine whether the at least one torque convert stall indicator indicates that a torque converter stall condition exists. The term "torque converter stall" is generally understood to define an operating condition of a torque converter in which a prime mover is applying torque to the pump but the turbine cannot rotate. In the context of FIG. 1, torque converter stall is thus an operating condition of the torque converter 20 in which the internal combustion engine 12 is applying torque to the pump 18 but the turbine 22 cannot rotate. In one embodiment, the transmission control circuit 40 is operable to execute steps 102 and 104 by monitoring the rotational speed, TS, of the turbine 22, e.g., via the turbine speed signal produced by the speed sensor 54, and determining that a torque converter stall condition exists if TS is less than a threshold speed value, e.g., at or near zero rpm. In an alternative embodiment, the transmission control circuit 40 is operable to execute steps 102 and 104 by monitoring the rotational speed, TS, of the turbine 22, e.g., via the turbine speed signal produced by the speed sensor 54, and the rotational speed, PS, of the pump 18; e.g., via the pump speed signal produced by the speed sensor 50, and determining that a torque converter stall condition exists if TS is less than a threshold speed value, e.g., at or near zero rpm, and PS is greater than a threshold speed value. In any case, if the transmission control circuit 40 determines at step 104 that the at least one torque converter stall indicator indicates that a torque converter stall condition exists, execution of the process 100 advances to step 106. Otherwise, the process 100 loops back to step 102.

At step 106, the transmission control circuit 40 is operable to determine the current torque converter slip speed, SS, which is defined as a difference between the rotational speed, PS, of the pump 18 and the rotational speed of the turbine 22. Illustratively, the transmission control circuit 40 is operable to execute step 106 by determining the rotational speed, PS, of the pump 18 by monitoring and processing the signal produced by the speed sensor 50, determining the rotational speed, TS, of the turbine 22 by monitoring and processing the signal produced by the speed sensor 54, and computing the slip speed, SS, as the rotational speed, PS, of the pump 18 less the rotational speed, TS, of the turbine 22. Thereafter at step 108, the transmission control circuit 40 is operable, in one embodiment, to determine whether the slip speed, SS, determined at step 106 is greater than a slip speed threshold, $SS_{TH}$. Illustratively, the slip speed threshold, $SS_{TH}$, is a slip speed above which the torque converter may generate excessive heat and therefore above which operation of the torque converter 20 is undesirable. If so, execution of the process 100 advances to step 110. Otherwise, the process 100 loops back to step 102.

In an alternate embodiment, the transmission control circuit 40 is operable at step 108 to determine whether the slip speed, SS, determined at step 106 is greater than a slip speed threshold, $SS_{TH}$, and whether the torque converter operating temperature is above an operating temperature threshold, $T_{TH}$. In this embodiment, the process 100 advances to step 110 only if the slip speed, SS, is above the slip speed threshold, $SS_{TH}$, and the torque converter operating temperature, TT, is above the operating temperature threshold, $T_{TH}$. In this embodiment, advancement of the process 100 to step 110 thus requires the slip speed, SS, to be undesirably high and the operating temperature, TT, of the torque converter 20 to also be undesirably high. In yet another alternative embodiment, step 108 may include only the single condition $SS>SS_{TH}$, but in this embodiment, $SS_{TH}$ is a function of the operating temperature, TT, of the torque converter 20. For example, $SS_{TH}$ may be defined to decrease with increasing torque converter operating temperature, TT, so that the process 100 advances to step 110 at lesser values of slip speed, SS, as the operating temperature, TT, of the torque converter 20 increases.

At step 110, the transmission control circuit 40 is operable to reset a first timer, TIMER1. Thereafter at step 112, the transmission control circuit 40 is operable to determine whether the value of TIMER1 is greater than a time value, T1, since resetting TIMER1 at step 112. If not, the process 100 advances to a sub-process "A" that will be described in detail hereinafter with respect to FIG. 3. Sub-process A has a "YES" branch and a "NO" branch, and the "YES" branch of sub-process A following the "NO" branch of step 112 loops back to the beginning of step 112 while the "NO" branch of sub-process A following the "NO" branch of step 112 advances to step 126. If, at step 112, the transmission control circuit 40 determines that the time value of TIMER1 is greater than T1, the process 100 advances to step 114 where the transmission control circuit 40 is operable to impose a first engine output torque limit, TL1, on the engine 12.

Illustratively, TL1 is chosen such that when the output torque produced by the engine 12 is limited to TL1, the slip speed, SS, of the torque converter 20 will be limited to a first slip speed limit, $SS_{L1}$, which is less than the current slip speed, SS, determined at step 106. In one embodiment, the transmission control circuit 40 is operable to determine the first engine output torque limit, TL1, as a function of the current slip speed, SS, determined at step 106 and of the first slip speed limit, $SS_{L1}$, or may alternatively be a constant stored in the memory 42 or determined as a function of one or more other or additional operating parameters, such as the operating temperature, TT, of the torque converter 20. Illustratively, the memory 42 may include one more tables, charts, graphs, one or more equations or the like that define TL1 as a function of SS and $SS_{L1}$, and in some embodiments further as a function of the operating temperature, TT, of the torque converter 20.

The engine control circuit 60 is operable in a conventional manner to control the output torque produced by the engine 12 via control of the fuel system 66. In one embodiment, the transmission control circuit 40 is operable to impose the first engine output torque limit, TL1, on the engine 12 by sending the first engine output torque limit, TL1, to the engine control circuit 60 via the data link 62, e.g., in the form of one or more messages broadcast by the transmission control circuit 40 on the data link 62. The engine control circuit 66 is then responsive to the first engine output torque limit, TL1, received from the transmission control circuit 40 to control the fuel command, FC, in a conventional manner such that the output torque produced by the engine 12 is limited to a maximum value defined by TL1. Illustratively, TL1 may be produced by the transmission control circuit 40 in the form of an actual engine output torque limit value, in which case the engine control circuit 66 is operable to control the fuel command, FC, such that the output torque produced by the engine 12 is limited to a maximum value of TL1. Alternatively, TL1 may be produced by the transmission control circuit 40 in the form of a torque offset value or a fractional torque multiplier, in which case the engine control circuit 66 is operable to control the fuel command, FC, such that the output torque produced by the engine 12 is limited as a function of TU.

Following step 114, the process 100 advances to step 116 where the transmission control circuit 40 is operable to reset a second timer, TIMER2, and to set the slip speed threshold value, $SS_{TH}$, to a slip speed threshold, $SS_{TL1}$, that is less than or equal to the first slip speed limit, $SS_{L1}$. The new slip speed threshold value, $SS_{TL1}$, will be used in the sub-process A. Illustratively, $SS_{TL1}$ may be $SS_{L1}$, be determined as a function of $SS_{L1}$, be a constant stored in the memory 42, or alternatively still be determined as a function of one or more other or additional operating parameters, such as the operating temperature, TT, of the torque converter 20. Thereafter at step 118, the transmission control circuit 40 is operable to determine whether the value of TIMER2 is greater than a time value, T2, since resetting TIMER2 at step 116. If not, the process 100 advances to the sub-process "A." The "YES" branch of sub-process A following the "NO" branch of step 118 loops back to the beginning of step 118 while the "NO" branch of sub-process A following the "NO" branch of step 118 advances to step 126. If, at step 118, the transmission control circuit 40 determines that the time value of TIMER2 is greater than T2, the process 100 advances to step 120 where the transmission control circuit 40 is operable to impose a second engine output torque limit, TL2, on the engine 12, where TL2<TL1.

Illustratively, TL2 is chosen such that when the output torque produced by the engine 12 is limited to TL2, the slip speed, SS, of the torque converter 20 will be limited to a second slip speed limit, $SS_{L2}$, which is less than the first slip speed limit, $SS_{L1}$, or may alternatively be a constant stored in the memory 42 or determined as a function of one or more other or additional operating parameters, such as the operating temperature, TT, of the torque converter 20. In one embodiment, the transmission control circuit 40 is operable to determine the second engine output torque limit, TL2, as a function of the first slip speed limit, $SS_{L1}$, determined at step 114 and of the second slip speed limit, $SS_{L2}$. Illustratively, the memory 42 may include one more tables, charts, graphs, one or more equations or the like that define TL2 as a function of SS and $SS_{L2}$, and in some embodiments further as a function of the operating temperature, TT, of the torque converter 20.

The transmission control circuit 40 is illustratively operable to impose the second engine output torque limit, TL2, on the engine 12 by sending the second engine output torque limit, TL2, to the engine control circuit 60 via the data link 62, e.g., in the form of one or more messages broadcast by the transmission control circuit 40 on the data link 62. The engine control circuit 66 is then responsive to the second engine output torque limit, TL2, received from the transmission control circuit 40 to control the fuel command, FC, in a conventional manner such that the output torque produced by the engine 12 is limited to a maximum value defined by TL2, where TL2 may be provided by the transmission control circuit 40 in any one or more of the various forms described hereinabove with respect to the first engine output torque limit, TL1.

Following step 120, the process 100 advances to step 122 where the transmission control circuit 40 is operable to reset a third timer, TIMER3, and to set the slip speed threshold value, $SS_{TH}$, to a slip speed threshold, $SS_{TL2}$, that is less than or equal to $SS_{L2}$. Illustratively, $SS_{TL2}$ may be $SS_{L2}$, may be determined as a function of $SS_{L2}$, may be a constant stored in the memory 42, or alternatively still may be determined as a function of one or more other or additional operating parameters, such as the operating temperature, TT, of the torque converter 20. Thereafter at step 124, the transmission control circuit 40 is operable to determine whether the value of TIMER3 is greater than a time value, T3, since resetting TIMER3 at step 122. If not, the process 100 advances to the sub-process "A." The "YES" branch of sub-process A following the "NO" branch of step 124 loops back to the beginning of step 124 while the "NO" branch of sub-process A following the "NO" branch of step 124 advances to step 126. If, at step 124, the transmission control circuit 40 determines that the time value of TIMER2 is greater than T3, and also following the "NO" branches of all executions of the sub-process A, the process 100 advances to step 126 where the transmission control circuit 40 is operable to remove the one or more engine output torque limits, i.e., TL1 and/or TL2. Illustratively, the transmission control circuit 40 is operable to remove the one or more engine output torque limits by ramping the currently imposed torque limit, i.e., TL1 or TL2, to zero. In one embodiment, the transmission control circuit 40 is operable to ramp the currently imposed torque limit to zero at a predefined ramp rate, although in other embodiments the transmission control circuit 40 may be operable to ramp the currently imposed torque limit to zero at a rate defined by one or more operating parameters, examples of which may be or include, but should not be limited to, the currently imposed engine output torque limit, the currently demanded engine output torque, e.g., demanded by the driver, a difference between the currently imposed engine output torque limit and the currently demanded engine output torque, the currently imposed slip speed limit, the difference between the original slip speed (determined at step 106) and the currently imposed slip speed limit, the current operating temperature of the torque converter, the difference between the operating temperature of the torque converter at the original slip speed (determined at step 106) and the current operating temperature of the torque converter, or the like. In any case, the process 100 loops back from step 126 to step 102.

Figure 3:
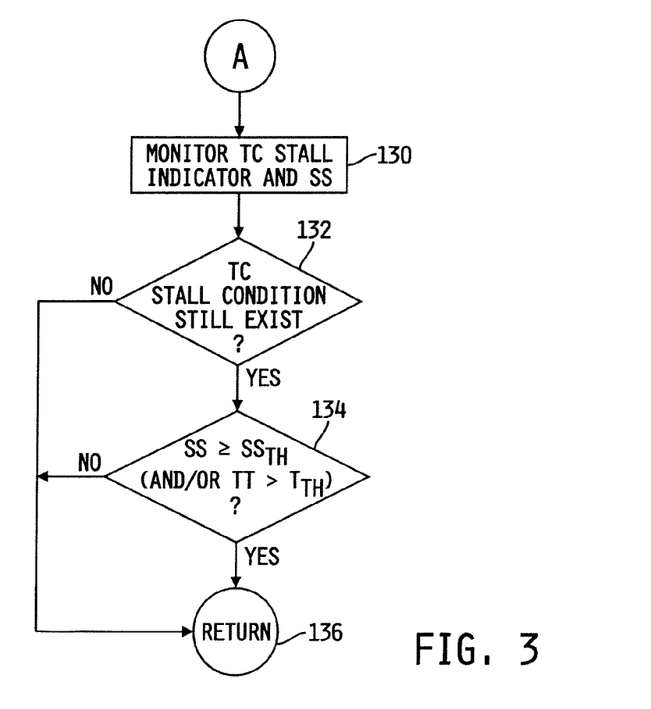
FIG. 3 is a flowchart of one illustrative embodiment of the sub-process "A" illustrated in the flowchart of FIGS. 2A and 2B.

Referring now to FIG. 3, a flowchart is shown of one illustrative embodiment of the sub-process A that forms part of the process 100 illustrated in FIGS. 2A and 2B. In the illustrated embodiment, the sub-process A begins at step 130 where the transmission control circuit 40 is operable to monitor the one or more torque converter stall indicators and the torque converter slip speed, SS, both as described hereinabove with respect to the process 100. Thereafter at step 132, the transmission control circuit 40 is operable to determine whether the torque converter stall condition still exists using any one or more of the techniques described hereinabove with respect to step 104 of the process 100. If not, the sub-process A advances to step 136 where the sub-process A returns to the process 100 via the "NO" branch of the output of sub-process A. If, at step 132, the transmission control circuit 40 determines that the torque converter stall condition still exists, the sub-process A advances to step 134 where the transmission control circuit 40 determines whether the current slip speed, SS, is greater than the current slip speed threshold, $SS_{TH}$, which, depending upon where in the process 100 the sub-process A is executed, may be the original slip speed threshold, $SS_{TH}$, used at step 108, the slip speed threshold $SS_{TL1}$ determined at step 116 or the slip speed threshold $SS_{TL2}$ determined at step 122. Alternatively or additionally, the transmission control circuit 40 may be operable at step 134 to determine whether the current operating temperature of the torque converter 20 is greater than the operating temperature threshold, $T_{TH}$. Alternatively still, the slip speed threshold, $SS_{TH}$, may be a function of the current operating temperature of the torque converter 20 as described hereinabove with respect to step 108 of the process 100. In any case, if the transmission control circuit 40 determines at step 134 that the current slip speed, SS, is greater than $SS_{TH}$ and/or the current operating temperature of the torque converter 20 is greater than $T_{TH}$, the sub-process A advances to step 134 where the sub-process A returns to the process 100 via the "YES" branch of the output of sub-process A. Otherwise, the sub-process A advances to step 134 where the sub-process A returns to the process 100 via the "NO" branch of the output of sub-process A.

In an alternate embodiment of the sub-process A, an additional timer may be implemented, or the timers TIMER1, TIMER2 and TIMER3 may be reconfigured, such that a timer decrement function occurs in the "NO" branch of the sub-process A. In this alternate embodiment, the corresponding timer is decremented each time the sub-process A follows the "NO" branch, and if the corresponding timer decrements beyond a specified value the process 100 is directed to step 126 for removal of the one or more torque limits. This decrement function thus provides for hysteresis in the application of, and removal of, the one or more imposed engine torque limits.

Figure 4:
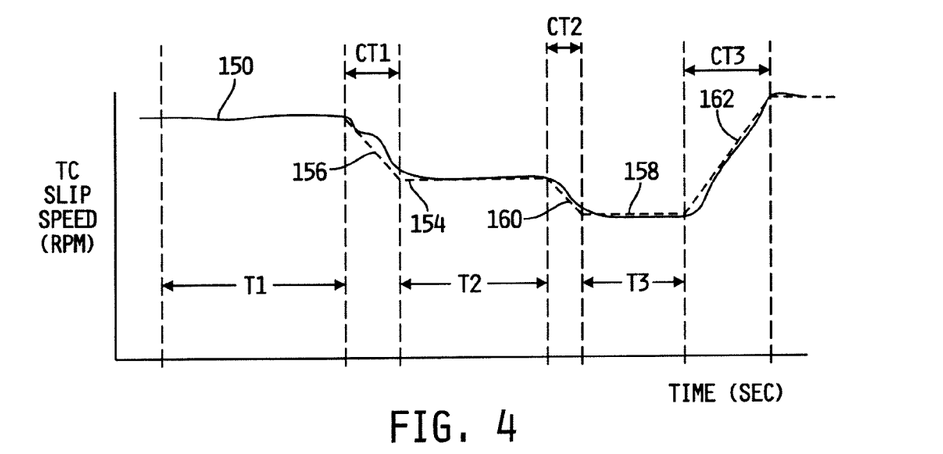
FIG. 4 is a plot of torque converter slip speed vs. time illustrating operation of the process of FIGS. 2A-3 and/or of FIGS. 5-6.

Referring now to FIG. 4, a plot of torque converter slip speed, SS, vs. time, e.g., in seconds, is shown that illustrates operation of the process 100 of FIGS. 2A and 2B. In the plot of FIG. 4, the torque converter slip speed, SS, is identified by the reference number 150, the TIMER1, TIMER2 and TIMER3 limits are identified by T1, T2 and T3 respectively, and the transition times between T1 and T2, between T2 and T3, and between T3 and complete removal of the one or more torque limits are identified by CT1, CT2 and CT3 respectively. Relative to the plot of FIG. 4, steps 102-106 take place before T1 begins, and T1 begins at the point step 108 follows the "YES" branch. When TIMER1 expires (step 112) with the stall condition still existing and with the slip speed and/or torque converter operating temperature requirements still met, the first engine output torque limit, TL1, is imposed. This results in a reduction of the slip speed 150 from its value determined at step 106 to the slip speed limit $SS_{L1}$, which is identified by the reference number 154 in the plot of FIG. 4. The transition time, CT1, between SS and $SS_{L1}$, which is identified by the reference number 156 in the plot of FIG. 4, may be a predetermined value or may be a function of one or more operating parameters, e.g., any one or more of the operating parameters described hereinabove with respect to step 136 of the process 100.

At the end of CT1, TIMER2 is reset (step 116) and T2 begins following this reset. When TIMER2 expires (step 118) with the stall condition still existing and with the slip speed and/or torque converter operating temperature requirements defined at step 116 still met, the second engine output torque limit, TL2, is imposed. This results in a further reduction of the slip speed 150 from $SS_{L1}$ (154) to the slip speed $SS_{L2}$, which is identified by the reference number 158 in the plot of FIG. 4. The transition time, CT2, between $SS_{L1}$ and $SS_{L2}$, which is identified by the reference number 160 in the plot of FIG. 4, may be a predetermined value or may be a function of one or more operating parameters, e.g., any one or more of the operating parameters described hereinabove with respect to step 136 of the process 100. At the end of CT2, TIMER3 is reset (step 122) and T3 begins following this reset. When TIMER3 expires (step 124), the current imposed torque limit (s) is/are ramped to zero during the transition period CT3, which is identified by the reference number 162 in the plot of FIG. 4, as described above with respect to step 136 of the process 100.

Figure 5:
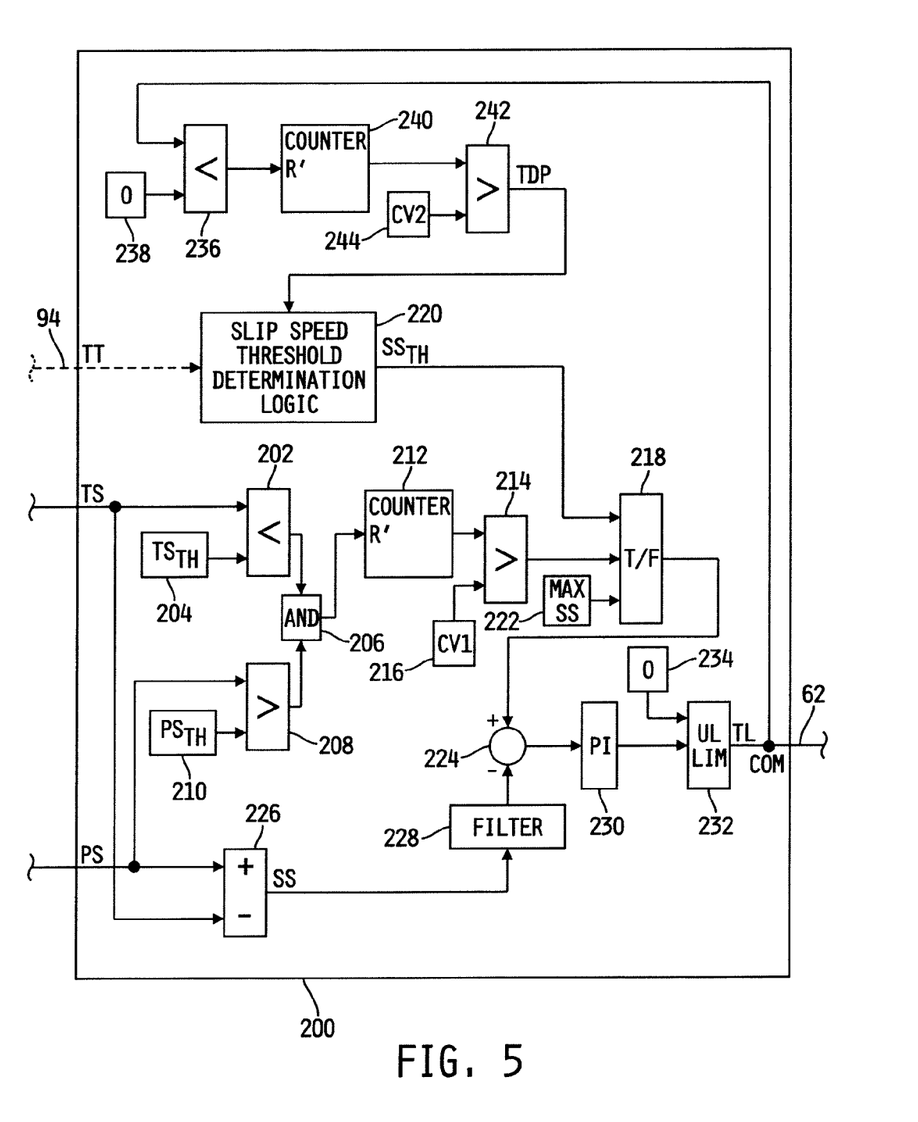
FIG. 5 is a logic diagram of another illustrative embodiment of a process, executable by the control circuit of FIG. 1, for controlling the operating temperature of the torque converter.

Referring now to FIG. 5, a logic diagram is shown of another illustrative embodiment of a process 200 for controlling the operating temperature of the torque converter 20 under torque converter stall conditions. In the illustrated embodiment, the process 200 produces a torque limit, TL, which, as described above with respect to the process 100, may be provided in the form of an actual torque limit value, a torque offset value or a fractional torque multiplier. In any case, the process 200 is illustratively stored in the memory 42 of the transmission control circuit 40 in the form of instructions that are executable by the transmission control circuit 40 to control the operating temperature of the torque converter 20 under torque converter stall conditions.

The process 200 will be described in terms of logic blocks and operations that are illustrated in FIG. 5 and that are executable by the transmission control circuit 40. In the illustrated embodiment, the process 200 includes a "less than" logic block 202 that receives as one input the turbine speed, TS, e.g., produced by the speed sensor 54. A turbine speed threshold value, $TS_{TH}$, is stored in a memory block 204 and is provided to a second input of the "less than" block 202. The output of the "less than" block is provided to one input of an AND block 206 having a second input receiving the output of a "greater than" block 208. One input of the "greater than" block receives the pump speed, PS, e.g., produced by the speed sensor 50, and another input receives a pump speed threshold value, $PS_{TH}$ that is stored in a memory block 210. The output of the AND bock 206 is provided to a reset (R') input of a counter block 212 having an output that is provided to one input of a "greater than" block 214. Another input of the "greater than" block receives a count value, CV1, that is stored in a memory block 216, and the output of the "greater than" block is provided to a control input of a true/false block 218. The "true" input of the true/false block 218 receives a slip speed threshold value, $SS_{TH}$, produced by a slip speed threshold determination logic block 220, and the "false" input of the true/false block 218 receives a maximum slip speed value, MAX SS, stored in a memory block 222.

The output of the true/false block 218 is provided to one additive input of a summation node 224. The pump speed, PS, is also provided to an additive input of another summation block 226 also having a subtractive input that receives the turbine speed, TS. The output of the summation block 226 is the slip speed, SS, of the torque converter 20, and is provided as an input to a filter block 228. In one embodiment, the filter block 228 is implemented as a first order lag filter, although other filter types are contemplated by this disclosure. In any case the output of the filter block 228 is provided to a subtractive input of the summation node 224, and the output of the summation node 224 is provided to an input of a conventional controller block 230. In one embodiment, the controller block 230 is provided in the form of a conventional proportional-integral (PI) controller, although other conventional controller types are contemplated by this disclosure.

The output of the controller block 230 is provided to an input of a limiter block 232 having an upper limit input receiving the value zero stored in a memory block 234. The output of the limiter block 232 is the torque limit value, TL, and is sent to the engine control circuit 60 by the transmission control circuit 40 via the data link 62, e.g., in the form of one or more messages broadcast by the transmission control circuit on the data link 62.

The output of the limiter block 232 is also provided to one input of another "less than" block 236 that has another input receiving the value zero stored in a memory block 238. The output of the "less than" block is provided to a reset input (R') of another counter block 240 having an output that is provided to one input of another "greater than" block 242. Another input of the "greater than" block 242 receives a count value, CV2, stored in a memory block 244. The output of the "greater than" block 242 is threshold determination parameter, TDP, which is provided as an input to the slip speed threshold determination logic block 220. As shown by dashed-line representation in FIG. 5, the torque converter operating temperature, TT, may be provided as an input to the slip speed threshold determination logic block 220 in some embodiments, although in other embodiments TT may not be provided as an input to the logic block 220.

Figure 6:
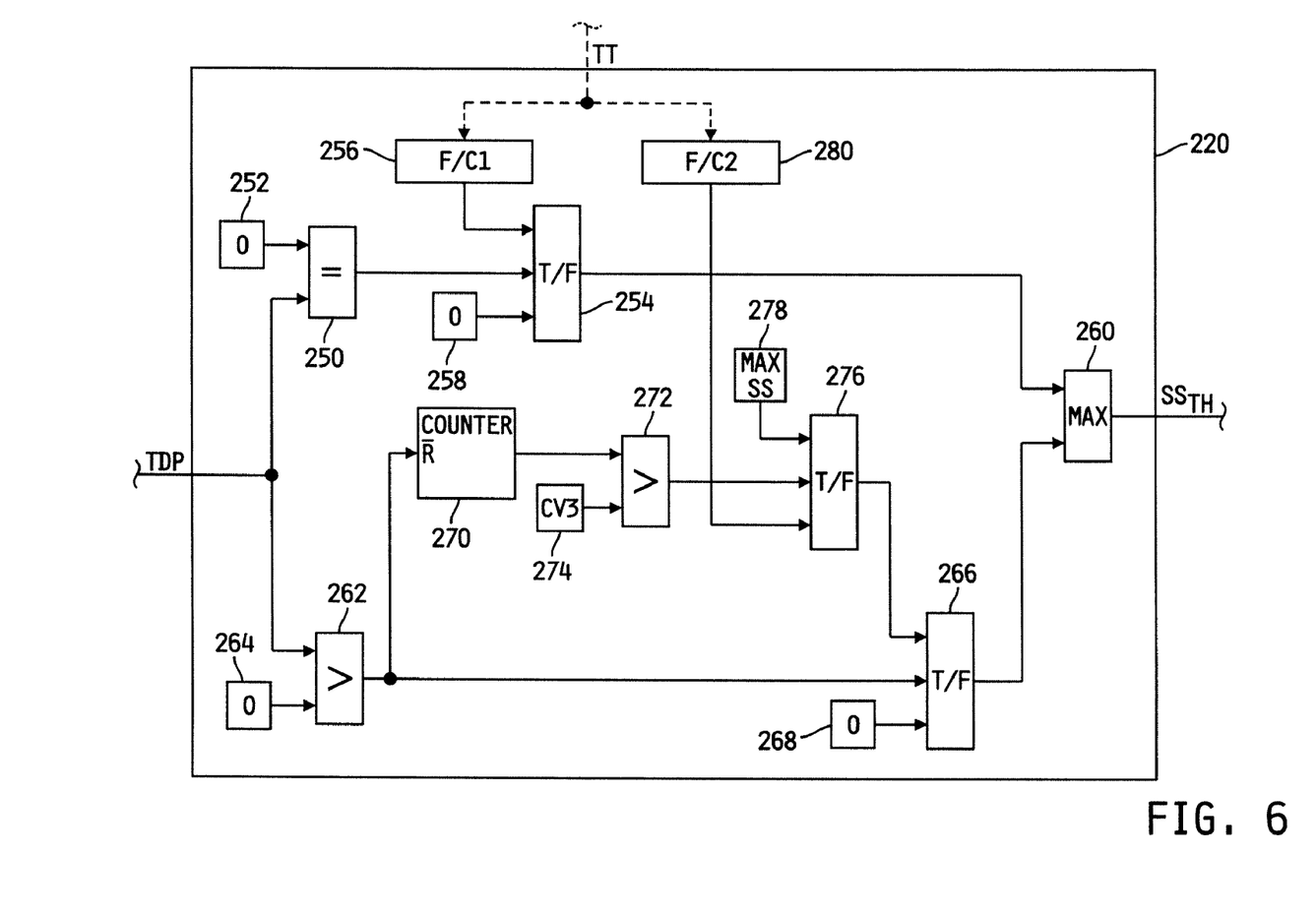
FIG. 6 is a logic diagram of one illustrative embodiment of the slip speed threshold determination logic block of FIG. 5.

Referring now to FIG. 6, a logic diagram is shown of one illustrative embodiment of the slip speed threshold determination logic block 220. In the illustrated embodiment, the logic block 220 includes an "equals" block 250 receiving as one input the threshold determination parameter, TDP, from the "greater than" block 242 of FIG. 5. Another input of the "equals" block 250 receives the value zero stored in a memory block 252, and the output of the "equals" block is provided to the control input of another true/false block 254. The "false" input of the true/false block 254 receives the value zero stored in a memory block 258, and the "true" input of the true/false block 254 receives the output of a first function/constant block 256. In some embodiments, the first function/constant block 256 receives as an input the torque converter operating temperature value, TT. In such embodiments, the first function/constant block 256 is operable to produce the first slip speed threshold value $SS_{TL1}$ (see step 116 of the process 100 of FIG. 2A) as a function of the current operating temperature, TT, of the torque converter 20. In other embodiments, the block 256 does not receive the torque converter operating temperature, TT, as an input, and in such embodiments the first function/constant block 256 is operable to produce the first slip speed threshold value, $SS_{TL1}$ as a constant stored in memory or as a function of one or more other operating parameters. In any case, the output of the true/false block 254 is provided as one input to a MAX block 260 that produces the slip speed threshold value, $SS_{TH}$, as its output.

The logic block 220 further includes a "greater than" block 262 that receives as one input the threshold determination parameter, TDP, produced by the "greater than" block 242 of FIG. 5, and that receives as another input the value zero stored in a memory block 264. The output of the "greater than" block 262 is provided to the control input of another true/false block 266. The "false" input of the true/false block 266 receives the value zero stored in a memory block 268, and the "true" input receives the output of another true/false block 276. The output of the true/false block 266 is provided as another input to the MAX block 260.

The output of the "greater than" block 262 is also provided to a reset (R') input of a counter block 270 having an output that is provided to one input of another "greater than" block 272. Another input of the "greater than" block receives a count value, CV3, stored in a memory block 274, and the output of the "greater than" block 272 is provided to the control input of another true/false block 276. The "true" input of the true/false block 276 receives a maximum slip speed value, MAX SS, stored in a memory block 278, and the "false" input of the true/false block 276 receives the output of a second function/constant block 280. In some embodiments, the second function/constant block 280 receives as an input the torque converter operating temperature value, TT. In such embodiments, the second function/constant block 280 is operable to produce the second slip speed threshold value $SS_{TL2}$ (see step 122 of the process 100 of FIG. 2B) as a function of the current operating temperature, TT, of the torque converter 20. In other embodiments, the block 280 does not receive the torque converter operating temperature, TT, as an input, and in such embodiments the second function/constant block 280 is operable to produce the second slip speed threshold value, $SS_{TL2}$ as a constant stored in memory or as a function of one or more other operating parameters.

With reference to the plot of slip speed, SS, vs. time illustrated in FIG. 4, operation of the process 200 of FIG. 5 will now be described. Initially, the counter 212 is in reset so the true/false block 218 produces the maximum slip speed value, MAX SS. As long as MAX SS is greater than the actual slip speed value produced by the filter 228, the controller 230 will produce a positive value and the limiter 232 will limit this value to zero. In the illustrated embodiment, the torque converter stall condition is detected when the turbine speed, TS, is less than $TS_{TH}$ and the pump speed, PS, is greater than $PS_{TH}$. Illustratively, $TS_{TH}$ is near zero and $PS_{TH}$ is set to a value above which the torque converter can generate an undesirable amount of heat, although other values of $TS_{TH}$ and $PS_{TH}$ are contemplated. In alternative embodiments, the stall condition may be detected only based on TS being below $TS_{TH}$. In any case, when the torque converter stall condition is detected, the output of the AND block 206 takes the counter 212 out of reset so the counter 214 begins counting. This begins the time period T1 illustrated in FIG. 4. The value CV1 is selected to define the duration of T1.

When the count value of the counter 212 exceeds CV1, the control input of the true/false block 218 switches so that the true/false block 218 produces as its output the slip speed threshold value, $SS_{TH}$, produced by the slip speed threshold determination logic block 220. Because the initial value of TL produced by the limit block 232 is zero, the counter 240 will also be in reset, which causes TDP to initially be zero. Referring to FIG. 6, when TDP is zero, the true/false block 254 produces the first slip speed threshold value, $SS_{TL1}$, and the true/false block 266 produces a zero output. The slip speed threshold, $SS_{TH}$, produced by the slip speed threshold determination block 220 is thus the slip speed, $SS_{TL1}$, produced by the first function/constant block 256. The slip speed threshold $SS_{TL1}$ corresponds to the slip speed 154 illustrated in the plot of FIG. 4.

If the actual slip speed, SS, produced by the filter 228 is greater than $SS_{TL1}$, the output of the summation node 224 is a negative speed error value, and the controller block 230 is operable to produce a torque limit value, TL, that minimizes this speed error value. Because the speed error value is negative, the torque limit, TL, will likewise be produced as a negative value, which the engine control circuit 60 will interpret as a torque reduction limit. As illustrated in FIG. 4, the engine output torque will be reduced by the engine control circuit 60 such that the resulting slip speed, SS, 150 will thus be reduced to, and limited by, the slip speed threshold value, $SS_{TL1}$ 154.

As long as the actual slip speed, SS, produced by the filter block 228 is greater than $SS_{TH}$ produced by the slip speed threshold determination block 220, TL will be negative, and when this initially occurs when limiting the slip speed to the slip speed threshold 154 as just described, the output of the "less than" block 236 takes the counter 240 out of reset and the counter 240 begins counting. Illustratively, CV2 is set to the duration of T2 (see FIG. 4) so that when the slip speed, SS, has been limited to $SS_{TL1}$ for the time period T2, the output of the "greater than" block 242 switches so that TDP is now greater than zero. This causes the output of the true/false block 254 (FIG. 6) to produce a zero output. The change of state of TDP also causes the output of the "greater than" block 262 to change state, which takes the counter 270 out of reset and causes the output of the true/false block 266 to produce as its output the output of the true/false block 276. The value of CV3 is illustratively set to the time duration of T3 (see FIG. 4), so that when the counter 270 comes out of reset and begins counting, the count value will not be greater than CV3 so that the output of the true/false block 276 will be equal to the second slip speed threshold value, $SS_{TL2}$. The slip speed threshold $SS_{TL2}$ corresponds to the slip speed 158 illustrated in the plot of FIG. 4.

Referring again to FIG. 5, when the slip speed threshold is reduced from $SS_{TL1}$ to $SS_{TL2}$ at the end of the time period T2 as just described, the output of the summation node 224 will become more negative as long as the actual slip speed, SS, produced by the filter 228 is greater than $SS_{TL2}$, and the resulting negative speed error value will cause the controller block 230 is to produce a more negative torque limit value, TL, that minimizes this speed error value. In this case, as illustrated in FIG. 4, the engine output torque will be reduced by the engine control circuit 60 such that the resulting slip speed, SS, 150 will be reduced to, and limited by, the slip speed threshold value, $SS_{TL2}$ 158.

When the count value of the counter block 270 exceeds CV3, the output of the true/false block 276 will switch to MAX SS. As described above, MAX SS will generally be more positive than any actual slip speed, SS, produced by the filter block 228, and the speed error produced by the summation node will thus be positive. At the end of the time period T3 the controller block 230 will accordingly produce a positive torque limit, which will be limited by the limiter block 232 to zero, thus removing the torque limit as illustrated in FIG. 4. The time constant of the filter block 228 and any inherent delay in the operation of the controller block 230 in minimizing the speed error produced by the summation node 224 will generally determine the transition times CT1, CT2 and CT3.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, in the embodiment of the process 100 illustrated in FIGS. 2A and 2B, the timers TIMER1, TIMER2 and TIMER3 are illustratively free-running timers that count upwardly or downwardly and are reset as described above. Likewise, the 212, 240 and 270 of the embodiment illustrated in FIGS. 5 and 6 are illustratively free-running counters that count upwardly and are reset as described. In alternative embodiments, any one or more of the timers and/or counters may be controlled to increment and decrement depending upon whether the torque converter stall conditions are met and/or continue to be met. For example, this disclosure contemplates embodiments in which one or more of the timers and/or counters are configured to decrement if the stall conditions are not, or do not continue to be, met, and in which the imposed engine torque limits are removed if the stall conditions are not, or do not continue to be met, for a specified time period to thereby provide for some hysteresis in the application and removal of one or more of the imposed engine torque limits.

What is claimed is:

1. A method for controlling the operating temperature of a torque converter during torque converter stall conditions, the torque converter having a pump rotatably driven by an internal combustion engine and a rotatable turbine fluidly coupled to the pump, the method comprising:
    determining whether the torque converter is currently in a torque converter stall condition, and
    if the torque converter is currently in the stall condition,
        determining a slip speed as a difference in rotational speeds between the pump and the turbine,
        determining an engine output torque limit as a function of the slip speed and a desired slip speed, and
        controlling the operating temperature of the torque converter by limiting output torque produced by the engine based on the engine output torque limit.

2. The method of claim 1 further comprising determining the desired slip speed based on the operating temperature of the torque converter.

3. The method of claim 1 wherein determining an engine output torque limit comprises determining a first engine output torque limit as a function of the slip speed if the torque converter has been in the stall condition for at least a first predefined time period and the slip speed is greater than a first desired slip speed,
    and wherein controlling the operating temperature of the torque converter comprises limiting the output torque produced by the engine based on the first engine output torque limit.

4. The method of claim 3 further comprising determining the first desired slip speed based on the operating temperature of the torque converter.

5. The method of claim 3 wherein determining an engine output torque limit further comprises determining a second engine output torque limit as a function of the slip speed if the torque converter has been in the stall condition for at least a second predefined time period after limiting the output torque produced by the engine based on the first engine output torque limit and the slip speed is greater than a second desired slip speed that is less than the first desired slip speed,
    and wherein controlling the operating temperature of the torque converter further comprises limiting the output torque produced by the engine based on the second engine output torque limit such that the output torque produced by the engine is limited to an engine output torque that is less than when the output torque produced by the engine is limited based on the first engine output torque limit.

6. The method of claim 5 further comprising determining the second desired slip speed based on the operating temperature of the torque converter.

7. The method of claim 1 further comprising:

monitoring whether the torque converter continues to be in the stall condition when the output torque of the engine is being limited based on the engine output torque limit, and removing the engine output torque limit if the torque converter is no longer in the stall condition when the output torque of the engine is being limited based on the engine output torque limit.

8. The method of claim 7 wherein monitoring whether the torque converter continues to be in the stall condition when the output torque of the engine is being limited based on the engine output torque limit comprises:

monitoring rotational speed of the turbine, monitoring rotational speed of the pump, and determining that the torque converter is currently in the stall condition if the rotational speed of the turbine is less than a turbine speed threshold and the rotational speed of the pump is greater than a pump speed threshold.

9. The method of claim 7 wherein monitoring whether the torque converter continues to be in the stall condition when the output torque of the engine is being limited based on the engine output torque limit comprises:

monitoring a service brake of a vehicle carrying the torque converter, and determining that the torque converter is in the stall condition as long as the service brake is engaged and the rotational speed of the pump is greater than a pump speed threshold.

10. The method of claim 1 wherein determining whether the torque converter is currently in a torque converter stall condition comprises:

monitoring rotational speed of the turbine, monitoring rotational speed of the pump, and determining that the torque converter is currently in the stall condition if the rotational speed of the turbine is less than a turbine speed threshold and the rotational speed of the pump is greater than a pump speed threshold.

11. The method of claim 1 wherein determining an engine output torque limit comprises determining an engine torque limit offset as a function of the slip speed and the desired slip speed, and wherein limiting output torque produced by the engine based on the engine output torque limit comprises limiting an engine torque command used to command output torque produced by the engine as a function of the engine torque limit offset.

12. The method of claim 1 wherein determining an engine output torque limit comprises determining a fractional multiplier as a function of the slip speed and the desired slip speed, and wherein limiting output torque produced by the engine based on the engine output torque limit comprises limiting an engine torque command used to command output torque produced by the engine as a function of the fractional multiplier.

13. The method of claim 1 wherein determining an engine output torque limit comprises determining an maximum engine torque limit as a function of the slip speed and the desired slip speed, and wherein limiting output torque produced by the engine based on the engine output torque limit comprises limiting an engine torque command used to command output torque produced by the engine to a maximum value of the maximum engine torque limit.

14. A system for controlling the operating temperature of a torque converter during torque converter stall conditions, the system comprising:

a torque converter pump configured to be rotatably driven by an internal combustion engine, a torque converter turbine fluidly coupled to the pump and configured to be rotatably driven by the pump through the fluid coupling between the pump and turbine, a pump speed sensor configured to produce a pump speed signal corresponding to rotational speed of the pump, a turbine speed sensor configured to produce a turbine speed signal corresponding to rotational speed of the turbine, and a first control circuit including a memory having instructions stored therein that are executable by the first control circuit to process the pump and turbine speed signals to determine whether the torque converter is currently in a torque converter stall condition, and if the torque converter is currently in the stall condition to determine a slip speed as a difference in rotational speeds between the pump and the turbine, to determine an engine output torque limit as a function of the slip speed and a desired slip speed, and to control the operating temperature of the torque converter by limiting output torque produced by the engine based on the engine output torque limit.

15. The system of claim 14 further comprising means for determining the operating temperature of the torque converter, wherein the instructions stored in the memory of the first control circuit further include instructions that are executable by the first control circuit to determine the desired slip speed based on the operating temperature of the torque converter.

16. The system of claim 14 further comprising:

a second control circuit including a memory having instructions stored therein that are executable by the second control circuit to control output torque produced by the engine, and a communication link established between the first and second control circuits, wherein the instructions stored in the memory of the first control circuit include instructions that are executable by the first control circuit to limit output torque produced by the engine based on the engine output torque limit by sending the engine output torque limit to the second control circuit via the communication link, the instructions stored in the memory of the second control circuit including instructions that are executable by the second control circuit to control limit the output torque produced by the engine based on the engine output torque limit.

17. The system of claim 16 wherein the instructions stored in the memory of the first control circuit include instructions that are executable by the first control circuit to determine the engine output torque limit in the form of at least one of a torque offset, a fractional torque multiplier and a maximum torque limit.

18. The system of claim 14 wherein the instructions stored in the memory of the first control circuit include instructions that are executable by the first control circuit to determine an engine output torque limit as a function of the slip speed and a desired slip speed by determining a first engine output torque limit as a function of the slip speed if the torque converter has been in the stall condition for at least a first predefined time period and the slip speed is greater than a first desired slip speed, and to limit output torque produced by the engine based on the engine output torque limit by limiting the output torque produced by the engine based on the first engine output torque limit.

19. The system of claim 18 wherein the instructions stored in the memory of the first control circuit further include instructions that are executable by the first control circuit to determine an engine output torque limit as a function of the slip speed and a desired slip speed by determining a second engine output torque limit as a function of the slip speed if the torque converter has been in the stall condition for at least a second predefined time period after limiting the output torque produced by the engine based on the first engine output torque limit and the slip speed is greater than a second desired slip speed that is less than the first desired slip speed, and to limit output torque produced by the engine based on the engine output torque limit by limiting the output torque produced by the engine based on the second engine output torque limit such that the output torque produced by the engine is limited to an engine output torque that is less than when the output torque produced by the engine is limited based on the first engine output torque limit.

20. The system of claim 19 further comprising means for determining the operating temperature of the torque converter,
wherein the instructions stored in the memory of the first control circuit further include instructions that are executable by the first control circuit to determine the first and second desired slip speeds based on the operating temperature of the torque converter.

21. The system of claim 14 wherein the instructions stored in the memory of the first control circuit include instructions that are executable by the first control circuit to monitor whether the torque converter continues to be in the stall condition when the output torque of the engine is being limited based on the engine output torque limit, and to remove the engine output torque limit if the torque converter is no longer in the stall condition when the output torque of the engine is being limited based on the engine output torque limit.

* * * * *